June 5, 1951     H. E. HUDSON, JR     2,555,970
WATER PURIFICATION PROCESS
Filed Aug. 27, 1947
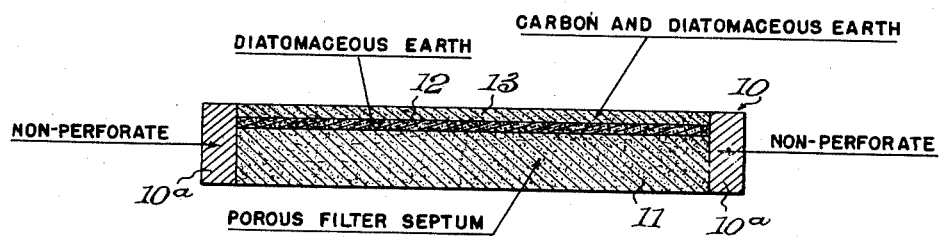
Inventor
Herbert E. Hudson, Jr.
By George W. Gardes
Joseph N. Conor
Attorneys Patented June 5, 1951

2,555,970

UNITED STATES PATENT OFFICE 2,555,970

WATER PURIFICATION PROCESS

Herbert E. Hudson, Jr., Champaign, Ill., assignor to the United States of America as represented by the Secretary of War Application August 27, 1947, Serial No. 770,798

3 Claims. (Cl. 210—203)

The present invention relates to an improved method of filtration involving the use of an adsorbent, and to an improved bed containing same. Ordinarily, adsorbents may be divided into two classes in accordance with their particle size. Particle sizes of 0.1 millimeters and above may be classified as granular; those substantially below this value, for want of a better term, may be referred to as nongranular or pulverulent. In this last class are found active carbons of the decolorizing type, fuller's earth and other decolorizing clays, alumina, silica gel, magnesia, etc. In many instances, as for example in the case of active carbon, alumina, silica gel, magnesia, the particle sizes may be increased by various treatments so that they fall in the granular class. In the treatment of liquids with nongranular adsorbents it is customary to carry out the treatment in batches by effecting an intimate mixture of the nongranular adsorbent and liquid, and then separating the adsorbent either by sedimentation or by use of a filter press or other filtering device, whereas in the use of granular adsorbents it is common practice to percolate the liquid to be treated through a bed of the granular adsorbent. Because of the fine particle size of the nongranular adsorbents, the percolation treatment is not practicable, although from a theoretical standpoint substantial advantages can be made out for percolation treatment over the aforementioned batch treatment. One such advantage is that the percolation treatment amounts in effect to an infinite number of countercurrent treatments in the last of which the most nearly pure liquid is in contact with the least used up particles. A further advantage is that because of the finer particle size of the nongranular material, a greater surface area is presented and a more efficient action of the adsorbent is had. Moreover, only the external surface of the granule is readily available for adsorption, thus making the granular-percolation treatment less efficient; and furthermore, channelling frequently occurs therein.

In accordance with the present invention, means have been devised whereby nongranular adsorbents may be used in a percolation bed whereby the advantages inherent in percolation may be combined with those inherent in a nongranular or pulverulent adsorbent. For the carrying out of this invention it has been found that diatomaceous earth, the particles of which are the bony skeletons of diatoms, containing in excess of 90% silica, function as a matrix for the nongranular particles so as to effect a structure having a porosity not greatly less than the diatomaceous earth alone when the supported adsorbent, as for example active carbon, is, say, not in excess of 50% of the diatomaceous earth.

This invention will be best understood by reference to the following illustrative examples taken in connection with the accompanying drawing, which shows a sectional elevation through the improved filter element looking in the direction of the arrow.

Referring in particular to the accompanying drawing, 10 denotes a so-called diatomaceous earth filter having nonperforate side walls 10$^a$, and a porous filter septum 11. The septum 11 is a fixed porous member that supports the diatomaceous earth particles, but permits passage of water, and may have a porosity such that the loss of head is as much as two pounds per square inch under various rates of flow that will maintain thereon a suitable thickness of the filter material to be described. The septum 11 is first overlaid with a covering layer from $\frac{1}{16}$ inch to $\frac{1}{8}$ inch thickness of diatomaceous earth, such layer being denoted by the numeral 12. Then a slurry of active carbon which will pass a 100 mesh screen but which will be contained on the 400 mesh screen, in the proportion of one pound of carbon to three pounds of diatomaceous earth, is applied in a quantity sufficient to form a further layer 13 of from $\frac{1}{8}$ inch to $\frac{3}{4}$ inch thick. In the forming of this layer it is desirable to supply the slurry under comparatively low pressure, i. e., five pounds per square inch in order that the resulting filter layer may be as permeable as possible. The two layers so formed will ordinarily cause a loss of head of from three to 25 pounds per square foot. The bed so made is of particular utility in purification of drinking water. In the bed so formed from 40 to 1000 gallons of water may be treated per square foot per run, the exact quantity depending upon the condition of the water, with a flow rate of from one and a half to five gallons per square foot per minute.

It will be noted that in the example given, $33\frac{1}{3}$ pounds of carbon are used for each 100 pounds of diatomaceous earth, making a concentration of fine adsorbent carbon which is relatively very high and enabling a bed of not greatly over one inch in thickness to have the capacity of granular beds many times this thickness. One further drawback of the use of granular adsorbents is that channelling frequently occurs, in which case a large quantity of the adsorbent is not utilized. Because of the thinness and compactness of the filter bed of the present invention, channelling does not take place. The bed is deposited hydraulically, which automatically fills up any channels that may tend to form, by deposition of the pulverulent material at points of greatest flow.

A further advantage of the improved filter bed is that the adsorbent layer may be quickly removed by backwashing and quickly formed again by reason of the smaller quantity required, and by the ease with which both adsorbents lend themselves to slurry formation.

Instead of finely divided activated carbon, there may be employed other adsorption materials, for example, fuller's earth, or silica gel, or finely divided ion-exchange material such as finely-comminuted zeolites or other compositions having ion exchange properties, such as ionic exchange resins.

The term "adsorbent" as used in the claims is intended to include both types of materials, generically.

It is known that it has been proposed in the prior art to incorporate active carbon in the top layer of a sand filter. Such a sand filter, however, necessarily uses sand of the granular type—the particles of which, moreover, have no affinity for the mongranular or pulverulent adsorbent, whereby a deep bed of sand is required. More importantly, however, because of this non-affinity of sand for the adsorbent, channelling is prone to occur. It is also known to use diatomaceous earth as a filter aid with active carbon for filtering fruit juices, for example, but likewise in this instance the bath or so-called contact method is used and the beneficial effect of my invention is not had.

While the present invention has been described herein as being applied to the purification of water, it will be understood that the same will be readily available for the purification of other liquids as well as oils.

Having thus described my invention, what I claim as new and wish to secure by Letters Patent is:

1. Apparatus for chemically purifying water, comprising a percolation bed through which water to be purified is adapted to be percolated, the said bed including a plurality of contiguous but separate layers, each of the layers being of preformed uniform thickness throughout, one of which layers is composed of diatomaceous earth and an adjacent layer is a composite particulate layer composed of diatomaceous earth intermingled with nongranular adsorbent means having a particle size substantially less than 0.1 millimeter, the diatomaceous earth in the composite layer being a matrix for the nongranular particles of the adsorbent means, the said nongranular particles being present in amount approximating one-third by weight of the diatomaceous earth present in the composite layer, the said composite layer being the layer first contacted by the water being percolated through the bed, the said composite layer having a porosity not substantially less than that of the diatomaceous earth alone, and a water-permeable supporting medium supporting the said layers.

2. Apparatus for chemically purifying water, comprising a percolation bed through which water to be purified is adapted to be passed by percolation, the said bed including a plurality of preformed superposed layers of predetermined uniform thickness throughout, the top layer being a particulate layer composed of diatomaceous earth and nongranular adsorbent means intermingled therewith, the diatomaceous earth being a matrix for the nongranular adsorbent means, the latter having a particle size less than 0.1 millimeter, the composite layer having a porosity not substantially less than that of the diatomaceous earth alone, the said composite particulate layer containing the non-granular adsorbent in amount approximating one-third by weight of the diatomaceous earth present in this layer, the said particulate composite layer being of substantially uniform depths throughout and in the range of from approximately one-eighth inch to approximately three-fourths inch in depth, a layer of diatomaceous earth underlying the composite layer, the diatomaceous earth layer being of uniform thickness throughout and in the range of from approximately one-sixteenth inch to one-eighth inch in depth, and a water-permeable supporting medium under the said layer's for supporting the same.

3. Apparatus for purifying and filtering water, which consists in a preformed percolation bed through which the water is percolated, the said bed consisting of a plurality of separate, preformed, particulate layers of purifying materials, each layer being of predetermined uniform thickness throughout, the layer first contacted by the water to be purified being composed of diatomaceous earth intermingled with particles of pulverulent adsorbent material having a particle size substantially less than 0.1 millimeter, the pulverulent particles of adsorbent material being present in amount approximating one-third by weight of the diatomaceous earth present in the composite layer, the said composite layer having a porosity not substantially less than that of the diatomaceous earth constituent alone, the said diatomaceous earth constituent being a matrix for the pulverulent adsorbent material, the layer of the bed next contacted by the water consisting of particles of diatomaceous earth alone, and a water-permeable medium carrying the layers of the bed.

HERBERT E. HUDSON, Jr.

REFERENCES CITED

The following references are of record in the file of this patent:

UNITED STATES PATENTS

| Number | Name | Date |
|---|---|---|
| 1,981,877 | Pierce | Nov. 27, 1934 |
| 2,202,806 | Alton | May 28, 1940 |
| 2,219,581 | Schmidt | Oct. 29, 1940 |
| 2,283,172 | Bates | May 19, 1942 |
| 2,305,657 | Aehnelt | Dec. 22, 1942 |
| 2,361,754 | McFarland, Jr. | Oct. 31, 1944 |
| 2,368,949 | Smith | Feb. 6, 1945 |